Sept. 2, 1969     H. W. MORRIS     3,464,347
BALER FEEDER ASSEMBLY
Filed Aug. 2, 1967     2 Sheets-Sheet 1
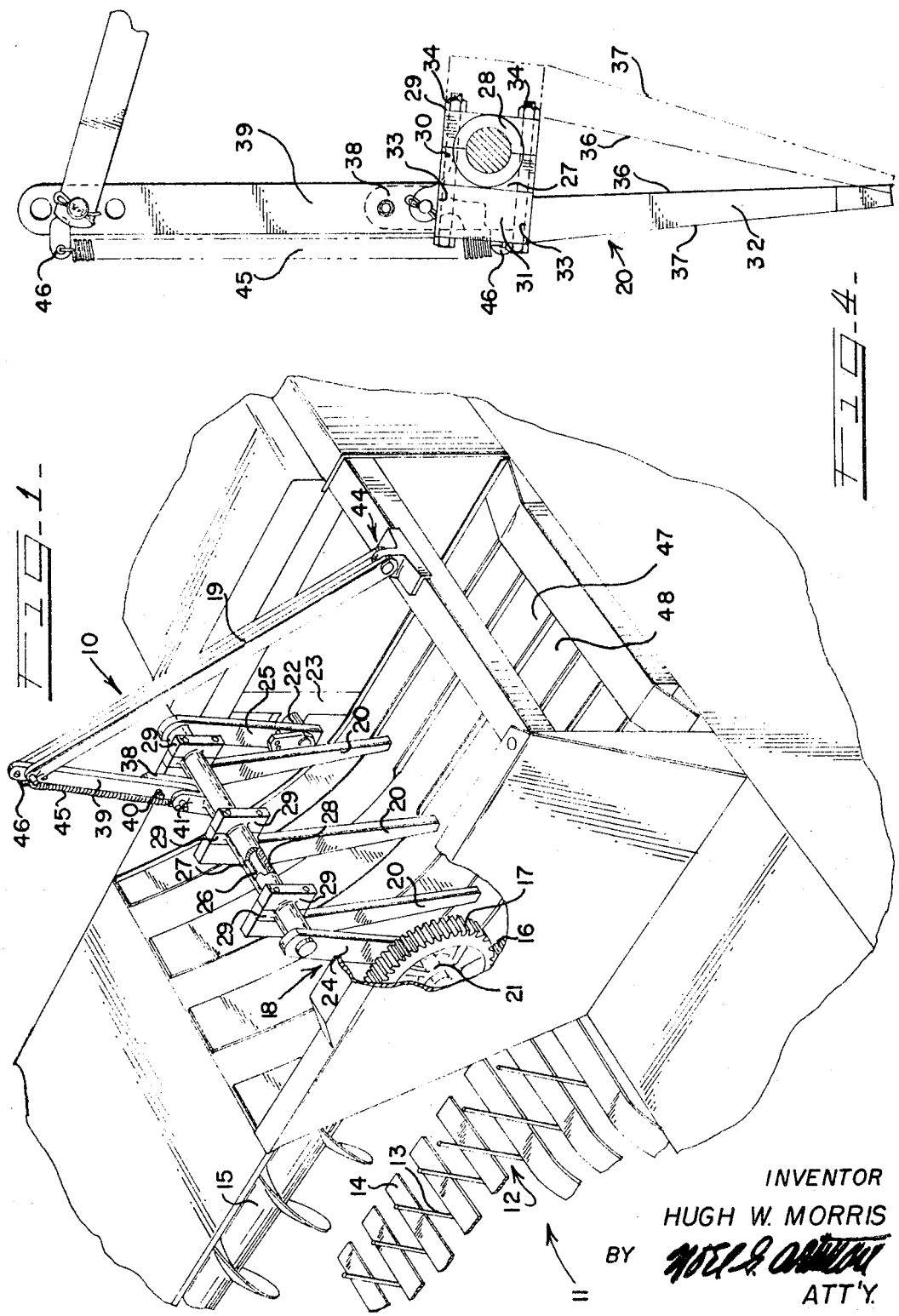
INVENTOR
HUGH W. MORRIS
BY
ATT'Y.

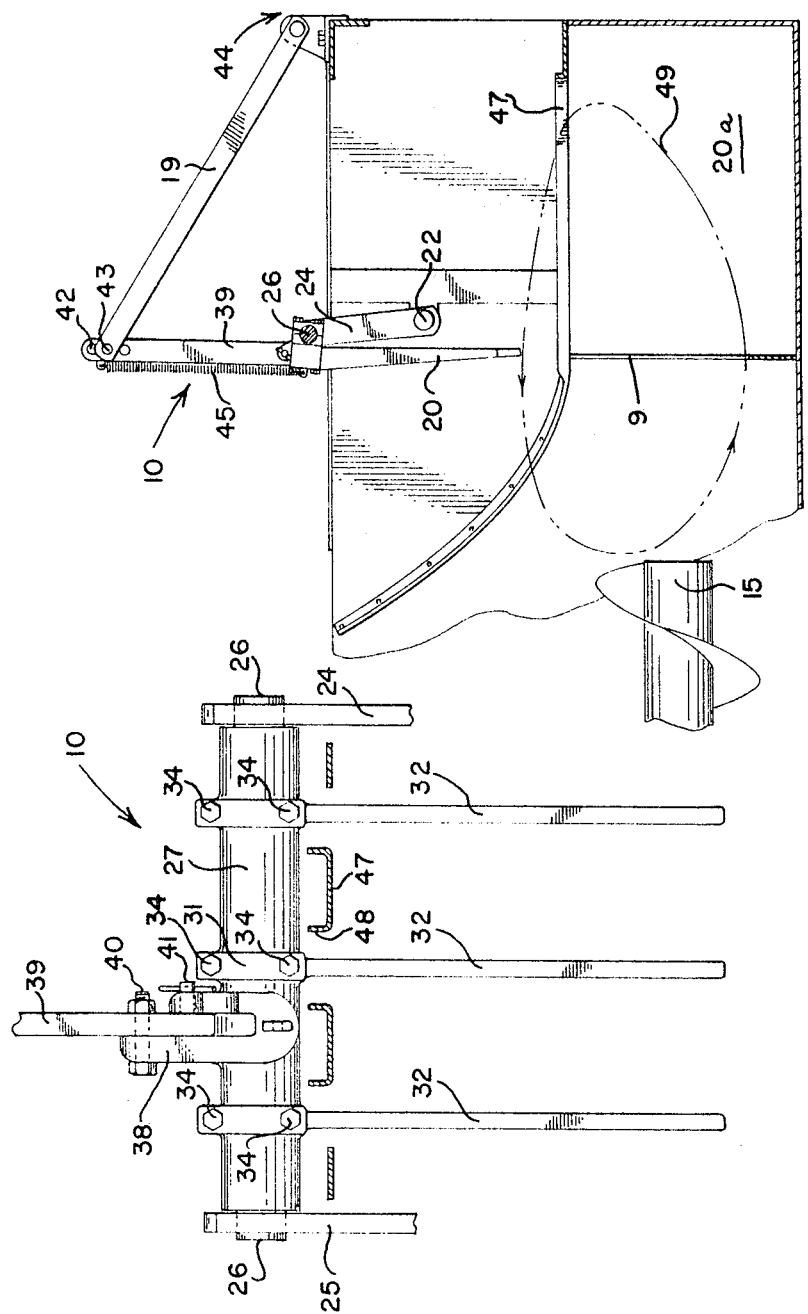

3,464,347
BALER FEEDER ASSEMBLY
Hugh W. Morris, Corinth, Miss., assignor to International Harvester Company, Chicago, Ill., a corporation of Delaware
Filed Aug. 2, 1967, Ser. No. 657,896
Int. Cl. B30b 15/20, 1/00
U.S. Cl. 100—189                                    5 Claims

ABSTRACT OF THE DISCLOSURE

A feeder assembly for use in a hay baler, the feeder assembly comprising a four bar linkage having a crankshaft, a fixed crank, a connecting linkage, and a plurality of detachable feeded fingers. The feeder fingers are adjustable to change the configuration of its leading edge, thereby changing the feeding characteristics of the feeder assembly.

Background and summary of the invention

This invention relates generally to a feeder mechanism for balers and more particularly to a feeder characterized by a set of feeder fingers adapted to sweep hay into the bale chamber.

Feeders of various forms and description have long been used in conjunction with augers to feed hay from the baler deck into the bale chamber. The basic design was pioneered by Charles F. Crumb (see U.S. Patent No. 2,450,082 issued Sept. 28, 1948). Over the years structural improvements have been made but the basic principle of operation remains the same: the feeder assembly comprises a four bar linkage having a set of feeder fingers which orbit in a kidney-shaped path between the space above the feed deck and bale chamber; the action of the fingers sweeps hay into the bale chamber in timed relation to reciprocations of the bale plunger.

Although the assembly in the past included adjustments for varying the feeder action as hay conditions change, the general configuration of the fingers could not be altered. Improvements were made in the design which permitted replacement of the feeder fingers to attain the desired characteristics. In order to be equipped for varying hay conditions, the operator was then required to retain two sets of feeder fingers. This not only increased equipment costs, but proved cumbersome to the operator.

The purpose of the present invention is therefore to provide a bale feeder assembly having means for changing the configuration of the feeder fingers.

Drawings

FIGURE 1 is a perspective view of the feeder assembly shown mounted on a baler;

FIGURE 2 is a side elevational view of the feeder assembly with portions cut tway for convenience of illustration;

FIGURE 3 is an isolated and enlarged view of the feeder assembly shown in FIGURE 2; and FIGURE 4 is a side view of the feeder mechanism shown in FIGURE 3.

Description of the preferred embodiment

In FIGURE 1 a feeder assembly 10 constructed in accordance with the principles of the present invention is shown mounted on a conventional baler designated generally as 11. Before describing the details of the feeder assembly 10, the components of a conventional baler insofar as they concern this invention will be described. A pick-up cylinder 12, equipped with spring loaded tines 13, lift a windrowed hay from the ground and deposits it on the feed deck 14. The cross-feed auger 15 forces charges of hay into the path of the orbiting feeder assembly 10 which moves the charges through a side opening 19 of a bale chamber 20a (see FIGURE 2). The feeder assembly 10 operates in timed relation with reciprocations of the baler plunger (not shown) through conventional means including a pinion 16 and a drive gear 17.

The feeder assembly 10 comprises generally a crank shaft 18, a fixed crank 19 and a plurality of feeder fingers 20.

The crankshaft 18 is journalled to the baler 11 by means of coaxially aligned axles 21 and 22 which are respectively supported by a front support plate (not shown) and a knotter drive frame 23. Extending radially outwardly from the axles 21 and 22 are a pair of parallel arms 24 and 25. The outer ends of arms 24 and 25 are interconnected by a crankpin 26 which is situated a radial distance from axles 21 and 22, the axis of rotation of the crankshaft 18. The drive gear 17 is carried by the axle 21 at a point forwardly of its support. Axle 22 extends through the knotter drive frame 23 and is operatively connected to the knotter mechanism (not shown). Thus it will be appreciated that the pinion 16 drives the drive gear 17 which causes the crankshaft 18 to rotate about the axis of axles 21 and 22, which in turn actuates the knotter mechanism. By proper sizing of the pinion 16 and gear 17, and properly orienting the attitude of arms 24 and 25, the operation of the feeder assembly 10, the baler plunger, and the knotter mechanism may be synchronized. The crankpin 26 is encircled by a pair of semi-cylindrical caps 27 and 28 having complementary shaped interiors to provide a bearing surface for the crankpin 26. The caps 27 and 28 are each formed with integral raised portions or embossments 29 through which extend a pair of bolt openings 30. In assembling the caps 27 and 28, the embossments 29 of one cap are aligned with those of the other, the openings falling into alignment permitting the passage of bolts through the assembly. In the assembled position, the caps 27 and 28 substantially cover the axial extent of the crankpin 26.

In this embodiment of the invention, the feeder assembly 10 is provided with three individual feeder fingers 20 which are detachable from the assembly. As best seen in FIGURE 4 each finger 20 includes a head portion 31 and a tooth portion 32 depending from and integrally formed with the head portion 31. The head portion 31 has extending therethrough a pair of bolt openings 33 which, when the head portion 31 is placed in abutment with one of the embossments 29 align with openings 30. A nut and bolt assembly 34 clamps the stack-up of parts comprising caps 27, 28 and feeder finger 20 together about crankpin 26. In the solid line position of FIGURE 4 the feeder fingers 20 are clamped to cap 27. The dotted line position shows the feeder fingers 20 clamped to cap 28. The tooth portion 32 of the feeder finger 20 tapers from a maximum thickness adjacent the head portion 31 to a minimum thickness at its lower extremity. As shown in the solid line position of FIGURE 4, a leading edge 36 and trailing edge 37 of the tooth portion 32 slant forwardly of the head portion 31 with reference to the direction of movement of the feeder assembly on the feeding stroke. In the dotted line position the edges 36 and 37 have been reversed, thus changing the configuration of the feeder fingers 20 which results in a different feeding characteristic. Note that the angles of the edges 36 and 37 are selected so that the lower extremity occupies the same general position in either the solid or dotted line positions. This insures synchronized operation of the plunger with the feeder fingers 20 in either position.

A bracket 38 integrally formed in cap 26 provides the connection means for a linkage 39. The lower end of linkage 39 is pinned to the bracket at two longitudinally spaced points 40 and 41 so that the linkage 39 and the assembly comprising caps 27 and 28 pivot about crankpin 26 as a unit. Formed in the upper end of the linkage 39 are a plurality of longitudinally aligned openings 42 one of which receives a pin 43 which pivotally anchors one end of the fixed crank 19. The opposite end of the crank 19 is anchored to the baler 11 by an anchor bracket and pin as shown generally at 44.

The feeder assembly 10 may be provided with an overload safety feature; in which case the pin 40 is replaced with a shear bolt. A spring 45 interconnecting the upper end of linkage 39 and bracket 38 through eye connections 46 serves to maintain the general orientation of the feeder fingers 20 in the event the shear bolt 40 shears.

As shown in FIGURES 1 and 2, a stripper plate 47 separates the feeder assembly 10 and the bale chamber 20a. The stripper plate 47 is formed with slots 48 aligned with the feeder fingers 20. The feeder fingers 20 passing through the slots 48 trace a kidney shaped path 49 extending from a point proximate the auger 15 to a point well within the confines of the bale chamber 20a. Thus it will be appreciated that the fingers 20 traveling in the direction indicated by the arrow sweeps charges of hay delivered by the auger 15 through the opening 19 into the bale chamber 20a.

In operation, the fingers 20 are placed in the solid line or dotted line positions of FIGURE 4 depending on the condition of the hay. If light fluffy materials are encountered the position 1 is preferred because the fingers will feed the hay farther into the baling chamber; if coarse material is encountered, position 1 is preferred since the fingers will not move the hay into the bale chamber as far as position 2.

What is claimed is:
1. In a baler of the type having a cross feed deck, a baling chamber, and an opening between said feed deck and said baling chamber, a mechanism for moving hay from the feed deck through the opening into the baling chamber, said mechanism comprising:

a crankshaft rotatably mounted on said baler, and including a pin orbital in a closed path, generally perpendicular to the plane of said opening attendant to rotation of said crankshaft;

a plurality of fingers spaced along said pin, said fingers each having a leading edge and a trailing edge; and mounting means journaling said fingers to said pin in a first position wherein said fingers depend from one side of said pin, said mounting means including a portion anchored to said baler so that rotation of said crankshaft causes said fingers to pass through said opening on a feeding stroke, said mounting means including means for mounting said fingers to said pin in a second position wherein the leading and trailing edges of the first position respectively become the trailing and leading edges.

2. The mechanism as recited in claim 1 wherein said mounting means includes means for mounting said fingers on opposite sides of said pin, one of said sides determining the first position and the other of said sides determining the second position.

3. The mechanism according to claim 2 wherein said leading and trailing edges are of different configuration.

4. The mechanism according to claim 3 wherein the configuration of said leading edge of said fingers defines in said first position an angle of approach on said feeding stroke greater than that defined by the leading edge of said fingers in said second position.

5. The mechanism according to claim 4 wherein said leading edge of said fingers in said first position and said leading edge of said fingers in said second position trace identical paths of travel through said feeding stroke.

References Cited
UNITED STATES PATENTS

| | | | |
|---|---|---|---|
| 2,409,478 | 10/1946 | Dickow | 100—25 |
| 2,593,721 | 4/1952 | Bolton | 100—189 XR |
| 2,775,339 | 12/1956 | Cadier | 198—223 |
| 3,103,775 | 9/1963 | Evans et al. | 100—189 XR |
| 3,320,875 | 5/1967 | Vidrine | 100—24 |

PETER FELDMAN, Primary Examiner